(12) United States Patent
Aitharaju et al.

(10) Patent No.: US 12,257,788 B2
(45) Date of Patent: Mar. 25, 2025

(54) PREFORM WITH VARIABLE FIBER DENSITY, FORMING AND MOLDING TOOL AND METHOD FOR FORMING OF COMPOSITE MATERIALS

(71) Applicant: GM GLOBAL TECHNOLOGY OPERATIONS LLC, Detroit, MI (US)

(72) Inventors: Venkateshwar R Aitharaju, Troy, MI (US); Erik Brandon Golm, Sterling Heights, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 17/977,083

(22) Filed: Oct. 31, 2022

(65) Prior Publication Data

US 2024/0140052 A1 May 2, 2024

(51) Int. Cl.
| | |
|---|---|
| *B29C 70/34* | (2006.01) |
| *B29C 45/00* | (2006.01) |
| *B29C 45/14* | (2006.01) |
| *B29C 45/80* | (2006.01) |
| *B29C 70/06* | (2006.01) |

(Continued)

(52) U.S. Cl.
CPC ........ *B29C 70/345* (2013.01); *B29C 45/0005* (2013.01); *B29C 45/14008* (2013.01); *B29C 45/14221* (2013.01); *B29C 45/80* (2013.01); *B29C 70/06* (2013.01); *B29K 2105/0809* (2013.01); *B29K 2313/00* (2013.01); *B29K 2995/0063* (2013.01); *B29L 2007/002* (2013.01)

(58) Field of Classification Search
CPC ....... B29C 70/34; B29C 70/345; B29C 70/48; B29C 70/54; B29C 70/541; B29C 70/543
See application file for complete search history.

(56) References Cited

U.S. PATENT DOCUMENTS

| | | | | |
|---|---|---|---|---|
| 5,217,654 | A | * 6/1993 | Buckley | .............. C08J 3/243 264/294 |
| 5,783,132 | A | * 7/1998 | Matsumoto | .............. B29C 70/78 264/257 |

(Continued)

FOREIGN PATENT DOCUMENTS

| | | |
|---|---|---|
| DE | 102019115447 A1 | 7/2020 |
| DE | 102020134447 A1 | 7/2021 |

(Continued)

OTHER PUBLICATIONS

Office Action dated May 23, 2024 from German Patent Office for German Patent No. 10 2023 110 208.7; 4pgs.

*Primary Examiner* — Yunju Kim

(57) ABSTRACT

A method for fabricating a composite panel includes providing a preform including a peripheral edge portion and a central portion. The central portion has a first thickness, the peripheral edge portion has a second thickness that is greater than the first thickness, and a first step is arranged between the central portion and the peripheral edge portion. The method includes providing a tool including a binder defining a second step, an upper punch, and a lower tool; arranging the preform between the binder and the upper punch and the lower tool; shaping the preform using the tool; and injection molding the preform in the tool to create the composite panel.

7 Claims, 6 Drawing Sheets

(51) Int. Cl.
*B29K 105/08* (2006.01)
*B29L 7/00* (2006.01)

(56) References Cited

U.S. PATENT DOCUMENTS

| | | | |
|---|---|---|---|
| 7,819,462 | B1 | 10/2010 | Owens |
| 8,033,592 | B2 | 10/2011 | Hsu et al. |
| 2006/0106147 | A1 | 5/2006 | Fasulo et al. |
| 2006/0199890 | A1 | 9/2006 | Fasulo et al. |
| 2007/0299185 | A1 | 12/2007 | Ottaviani et al. |
| 2010/0098925 | A1 | 4/2010 | Fasulo et al. |
| 2011/0121225 | A1 | 5/2011 | Posudievsky et al. |
| 2015/0068352 | A1* | 3/2015 | Heitz .................... B29C 70/543 |
| | | | 264/103 |
| 2016/0375643 | A1* | 12/2016 | Cho ...................... B29C 70/525 |
| | | | 264/149 |
| 2022/0347945 | A1* | 11/2022 | Blaise .................. B29C 70/541 |

FOREIGN PATENT DOCUMENTS

| | | | |
|---|---|---|---|
| EP | 3797963 | A1 | 3/2021 |
| WO | WO-2012 055 529 | A1 | 5/2012 |

\* cited by examiner

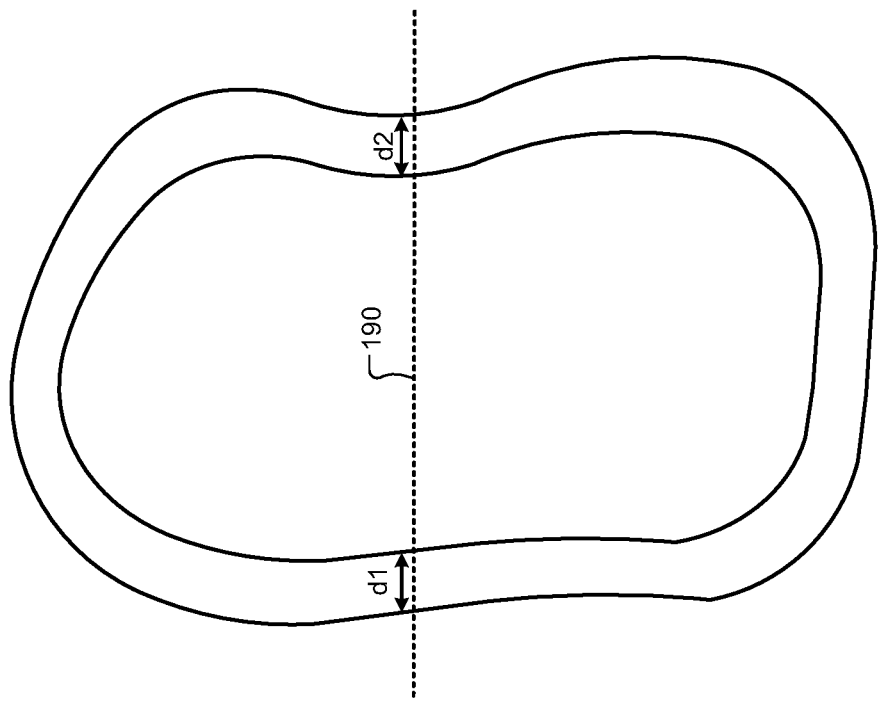
FIG. 9
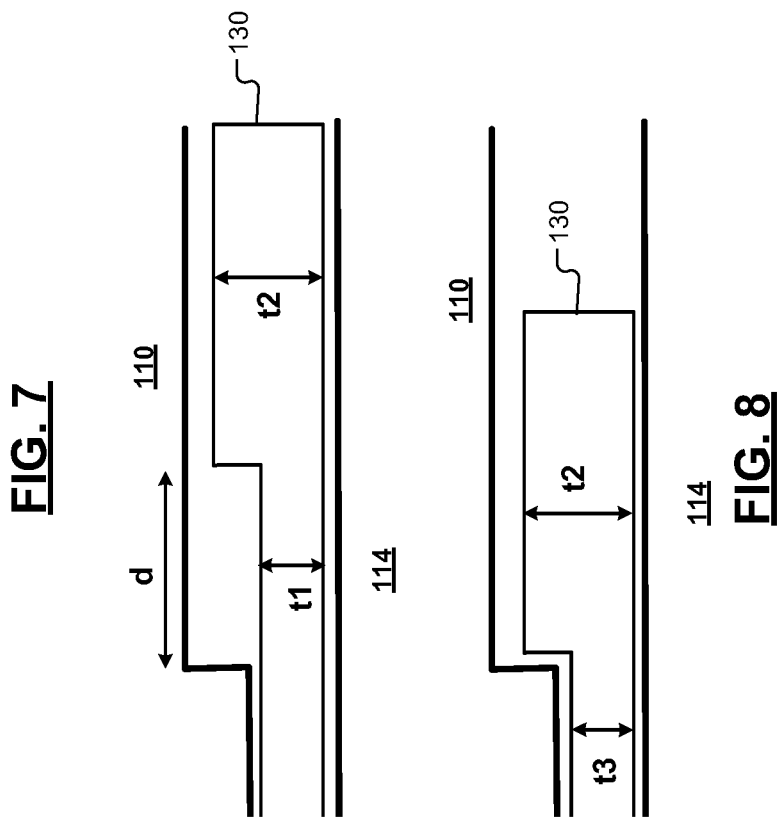
FIG. 7
FIG. 8

PREFORM WITH VARIABLE FIBER DENSITY, FORMING AND MOLDING TOOL AND METHOD FOR FORMING OF COMPOSITE MATERIALS

GOVERNMENT CLAUSE

This invention was made with government support under Grant No. DE-EE0009204 awarded by the U.S. Department of Energy. The Government has certain rights in this invention.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to composite materials, and more particularly to a method for forming composite materials.

Vehicles include structural components such as battery covers, hoods, decklids, doors, fenders, liftgates and other structural components. For example, a battery cover may be used to cover a battery system including one or more battery cells. To reduce the weight of the vehicle, some components can be made using composite materials such as carbon fiber.

SUMMARY

A method for fabricating a composite panel includes providing a preform including a peripheral edge portion and a central portion. The central portion has a first thickness, the peripheral edge portion has a second thickness that is greater than the first thickness, and a first step is arranged between the central portion and the peripheral edge portion. The method includes providing a tool including a binder defining a second step, an upper punch, and a lower tool; arranging the preform between the binder and the upper punch and the lower tool; shaping the preform using the tool; and injection molding the preform in the tool to create the composite panel.

In other features, the second step of the binder engages the first step of the preform as the upper punch presses the preform to position the preform relative to the tool. The method includes defining a first fiber density in first locations of the central portion of the preform and a second fiber density in second locations of the central portion of the preform. The first fiber density is lower than the second fiber density. The first locations of the central portion with the first fiber density correspond to locations of the preform that are at least one of curve, fold or bend during forming of the preform.

In other features, the method includes controlling the tool in response to sensing a location of the peripheral edge portion relative to the binder. The first fiber density and the second fiber density are defined using tailored fiber placement. The first step has a first predetermined height in a range from 1 to 4 mm. The first step of the preform has a height in a predetermined range from 1.05 to 2 times the height of the central portion. The second step has a second predetermined height in a range from 6 to 12 mm. Aa surface length of the composite panel minus a surface length of the preform in a vertical plane is equal to a sum of first and second distances between the first step and the second step on opposite sides of the preform in the vertical plane prior to pressing in the tool.

A tool for fabricating a composite panel includes a lower tool defining a cavity configured to shape a portion of a preform including a peripheral edge, a central portion, and a first step arranged between the peripheral edge and the central portion and defining a radially inwardly facing surface. A binder is moveable relative to the tool and includes a first surface defining a second step with a radially outwardly facing surface configured to bias the radially inwardly facing surface of the first step to center the preform relative to the tool. An upper punch is moveable relative to the binder and the tool and includes a fluid passage configured to deliver resin to impregnate a preform arranged between the upper punch and the lower tool.

In other features, a distance sensor arranged on the binder and configured to detect the peripheral edge of the preform. A controller is configured to control positioning of the tool in response to sensing the peripheral edge of the preform. The controller is configured to impregnate the preform with resin after confirming a position of the preform relative to the tool. The controller is configured to cause a robot to deliver the preform to the tool and to remove the composite panel from the tool. The second step has a second predetermined height in a range from 6 to 12 mm.

A preform for fabricating a composite panel includes a substrate including a central portion and a peripheral edge portion. Reinforcing fibers are attached to the substrate and define a first fiber density in first regions of the central portion of the substrate and a second fiber density in second regions of the central portion of the preform. The first fiber density is lower than the second fiber density. The central portion of the substrate has a first thickness. The peripheral edge portion of the substrate has a second thickness that is greater than the first thickness and form a first step.

In other features, the first regions of the central portion with the first fiber density correspond to locations of the preform that are at least one of folded or bent during forming of the preform. The first fiber density and the second fiber density are defined using tailored fiber placement. The first step has a first predetermined height in a range from 1 to 4 mm. The first step of the preform has a height in a predetermined range from 1.05 to 2 times the height of the central portion.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 7 to 8 are enlarged side cross-sectional views of an example of a binder, a lower tool, and a preform according to the present disclosure;

FIGS. 9 and 10 are plan views illustrating examples of a preform according to the present disclosure;

In the drawings, reference numbers may be reused to identify similar and/or identical elements.

DETAILED DESCRIPTION

Fabrication of a composite panel may include separate preforming and molding steps that are performed sequentially. When using this approach, a preform is manually placed in a tool between an upper punch and a lower tool. There is variability in draw-in amounts that occur during preforming, which increases scrap. As will be described further below, a method for fabricating a composite panel according to the present disclosure eliminates variability in draping, can be automated (reducing time and cost), and reduces scrap (reducing material cost).

Systems and methods for fabricating a composite panel according to the present disclosure reduce production costs using a one-step process performing both preforming and molding. Preforms according to the present disclosure include an outer edge defining a step with increased thickness. In some examples, the step extends in a direction parallel to a press direction (e.g., a vertical direction for a vertical press). The preforms also include variable fiber density (e.g., lower density at radius and/or curvature areas) for guided folding during a preforming process.

A tool for performing the process includes a stationary lower tool and an upper punch and a binder that are moveable relative to the lower tool. The binder tool defines a step to provide a surface to engage and bias the step of the preform as the binder and/or the upper punch are lowered. In some examples, the binder tool includes one or more distance sensors to monitor a thickness of the preform to confirm alignment of the preform prior to pressing the preform (which reduce scrap). The upper punch includes passages to allow resin to impregnate the preform after the preform is positioned and formed.

Figure 1:
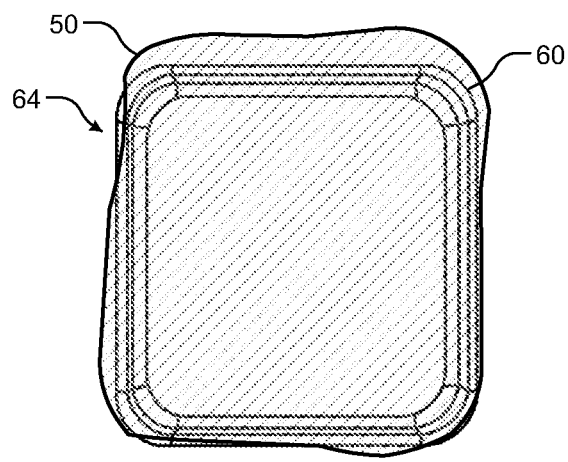
FIGS. 1 to 3 are plan views illustrating examples of preforms pressed by an upper punch into a lower tool with varying degrees of alignment.
Figure 2:
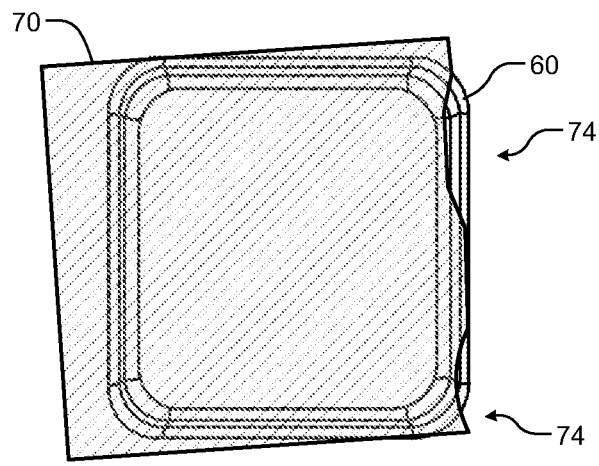
Figure 3:
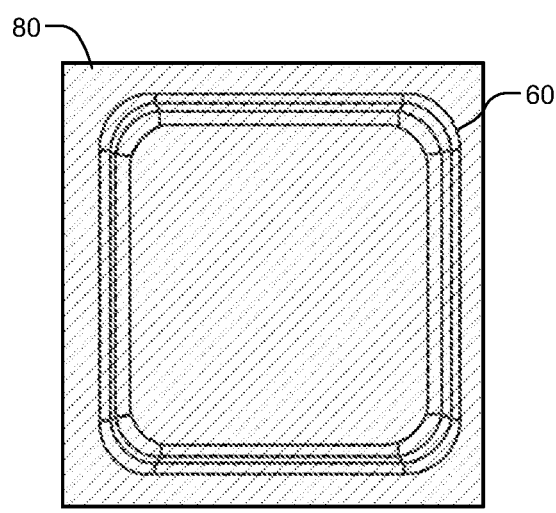

Referring now to FIGS. 1 to 3, examples of preforms 50 that are manually positioned and pressed by an upper punch into a lower tool 60 with varying degrees of alignment are shown. In FIG. 1, the preform 50 is draw in from the left side at 64. In FIG. 2, a preform 70 is draw in from the right side at 74. In FIG. 3, a preform 80 is generally centered relative to the lower tool.

Figure 4:
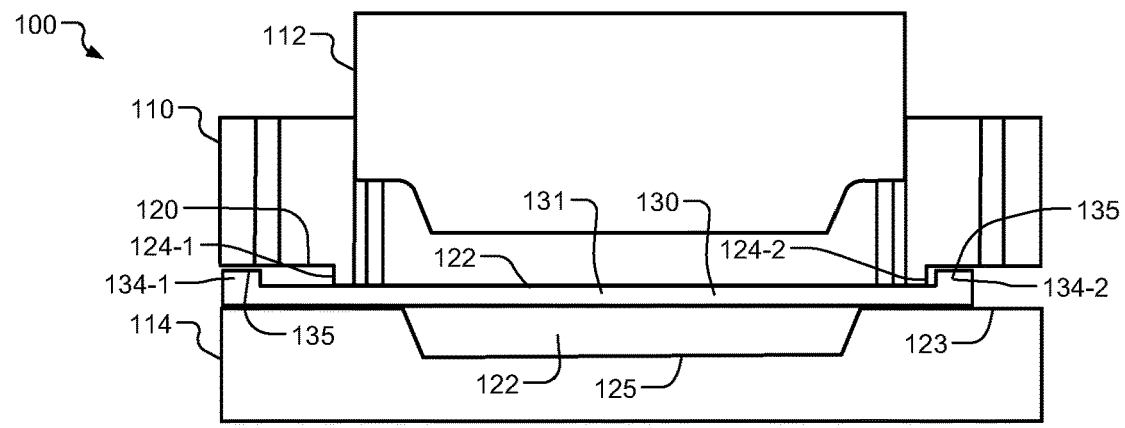
FIGS. 4 to 6 are side cross-sectional views of an example of a tool including an upper punch, a lower tool, and a binder according to the present disclosure.
Figure 5:
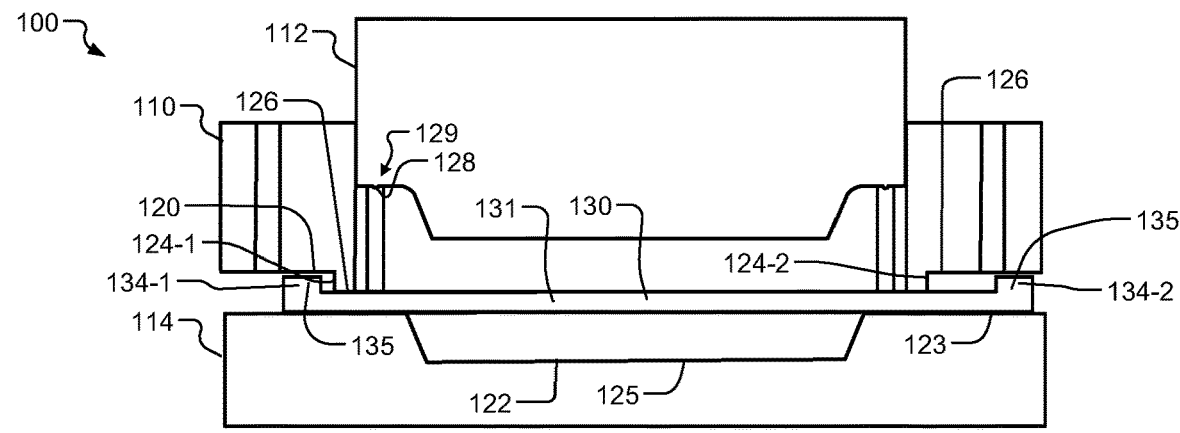
Figure 6:
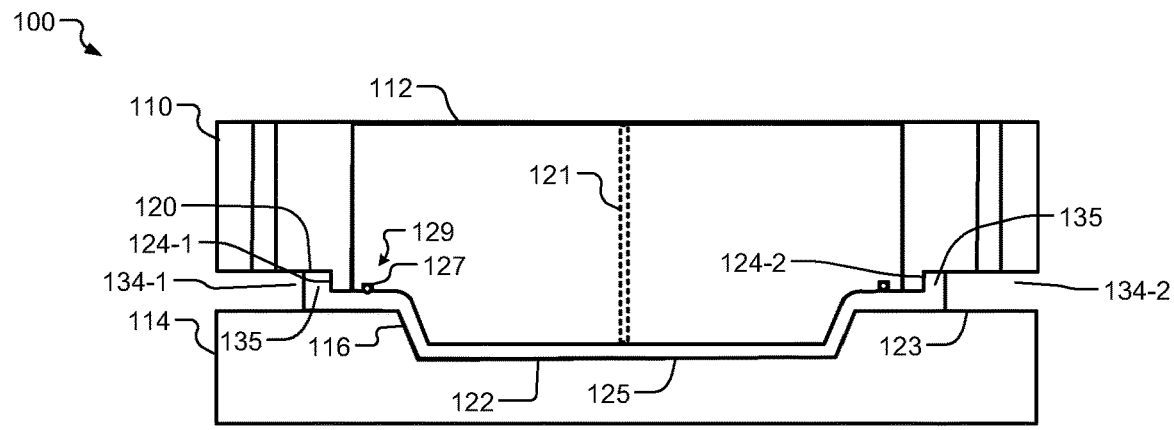

Referring now to FIGS. 4 to 6, a tool 100 performs both preforming and molding. The tool 100 includes an upper punch 112, a lower tool 114, and a binder 110. The lower tool 114 defines a cavity 122 on an upwardly facing surface thereof. While the cavity 122 is shown with a fixed depth and upper edges 123 and lower edges 125 that are parallel, the cavity 122 may have any shape and may have a variable height along the upper edge 123, a variable depth along the lower edge 125 and/or side surfaces with different heights, curvatures and/or profiles.

The binder 110 is vertically moveable relative to the upper punch 112 and the lower tool 114. The upper punch 112 is vertically moveable relative to the binder 110 and the lower tool 114. The binder 110 includes a lower surface 113 defining a radially inner portion 126 and a step 120. The step 120 defines a radially outwardly facing surfaces 124-1 and 124-2. The radially inner portion 126 extends below the step 120. A preform 130 to be processed by the tool 100 includes a body with a center portions 131 having a first thickness and peripheral edge portions 134-1 and 134-2 defining steps 135 and having a second thickness that is greater than the first thickness.

In FIGS. 4 and 5, positioning of the preform 130 on the tool 100 is less critical due to self-aligning features. In other words, the preform 130 can be located in non-central locations (to the left in FIG. 4 or to the right in FIG. 5). As the upper punch 112 moves downwardly, the outer edges 134-1 and 134-2 and radially outwardly facing surfaces 124-1 and 124-2 center the preform 130 relative to the tool 100. In FIG. 6, the upper punch 112 is seated against the preform 130 and the lower tool 114 where injection of resin and curing may be performed.

In some examples, the preform 130 is impregnated with resin during a predetermined impregnation period and then cured during a predetermined curing period. In some examples, the upper punch 112 includes one or more passages 121 allow resin to be injected at one or more locations to impregnate the preform 130 with resin. In some examples, the upper punch 112 includes a seal 129 such as an annular projection 128 (shown in FIG. 5) or O-ring 127 arranged in a groove (shown in FIG. 6) in a bottom surface of the upper punch 112 facing the preform 130 radially outside of a trim line where excess material is cutoff.

When designing the preform 130 for a desired component geometry, a detailed draping analysis is performed to determine draw-in amounts that are needed across various sections of the preform 130. The step of the binder 110 helps to position the preform 130 relative to the tool 100. In some examples, the step of the binder 110 has a height of 6-12 mm. In addition, the preform 130 is designed with peripheral edge portions 134-1 and 134-2 defining a step located at a distance from the step 120 in the binder 110 (prior to pressing) that is equal to a desired draw-in amount.

Using tailored fiber placement (TFP), the preform 130 is manufactured with fibers arranged at a higher fiber density in some locations and lower fiber density in locations that need to fold or bend. In some examples, an outer region of the preform where the binder clamps onto the preform can be made of a different material as compared to the rest of the preform to reduce scrap cost of the material that needs to be cut after forming.

The increase in thickness is achieved either by using a higher volume of fibers or over-braiding an incompressible material in the preform. In some examples, the thickness increase of the peripheral edge portions 134-1 and 134-2 relative to the center portions 131 of the preform 130 is in a range from 5% to 100% of a nominal thickness in the central portion. In some examples, the thickness at the outer edge is in a range from 1 to 4 mm greater than the nominal thickness. In some examples, the thickness at the outer edge is in a range from 2 to 3 mm greater than the nominal thickness.

Figure 15:
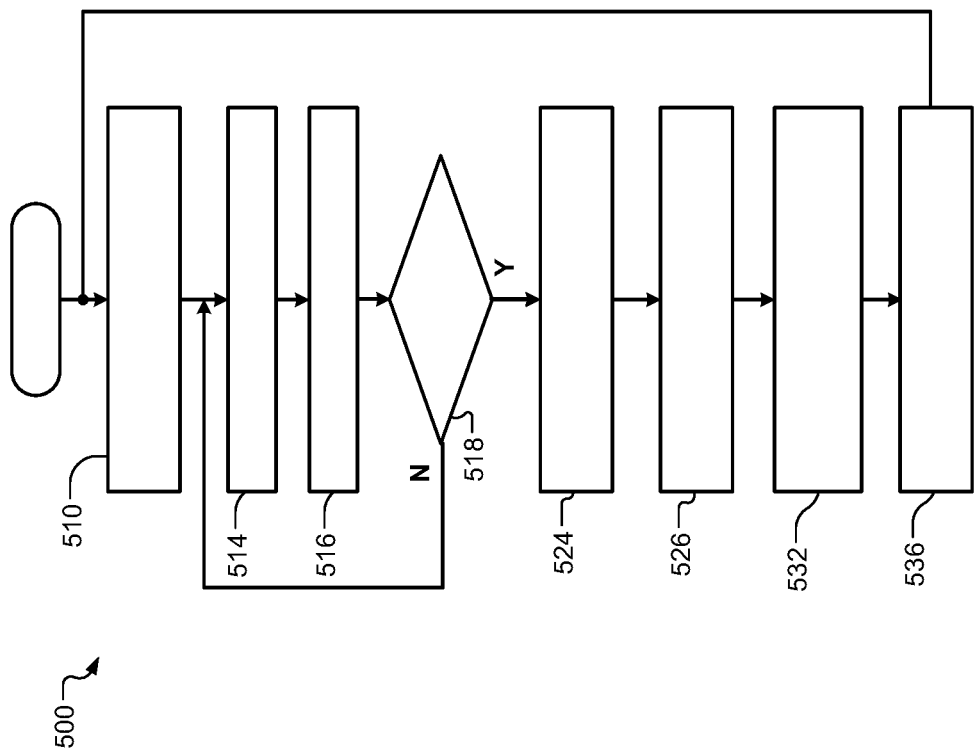
FIG. 15 is a flowchart of an example of a method for forming a composite material according to the present disclosure.
Figure 14:
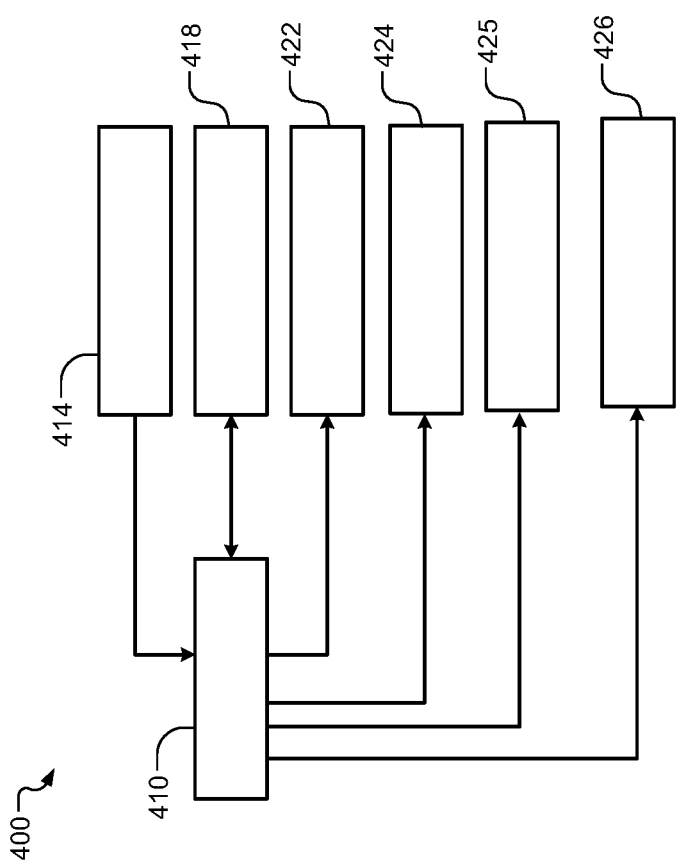
FIG. 14 is a functional block diagram of an example of a tool control system according to the present disclosure.

In some examples, the preform 130 is loaded into the tool 100 using a robot (FIGS. 14 and 15 described further below). The binder 110 is moved down to hold the preform 130. Very low tonnage force (e.g., less than 1000 lbs) is applied by the binder 110 to hold the preform 130. Then, the upper punch 112 is moved downwardly towards the lower tool 114 close the tool 100 using normal tonnage available from the press. During this process, the preform 130 draws, slips past the binder 110, and stops when the peripheral edge of the preform 130 is biased against the step 120 of the binder 110.

Figure 12:
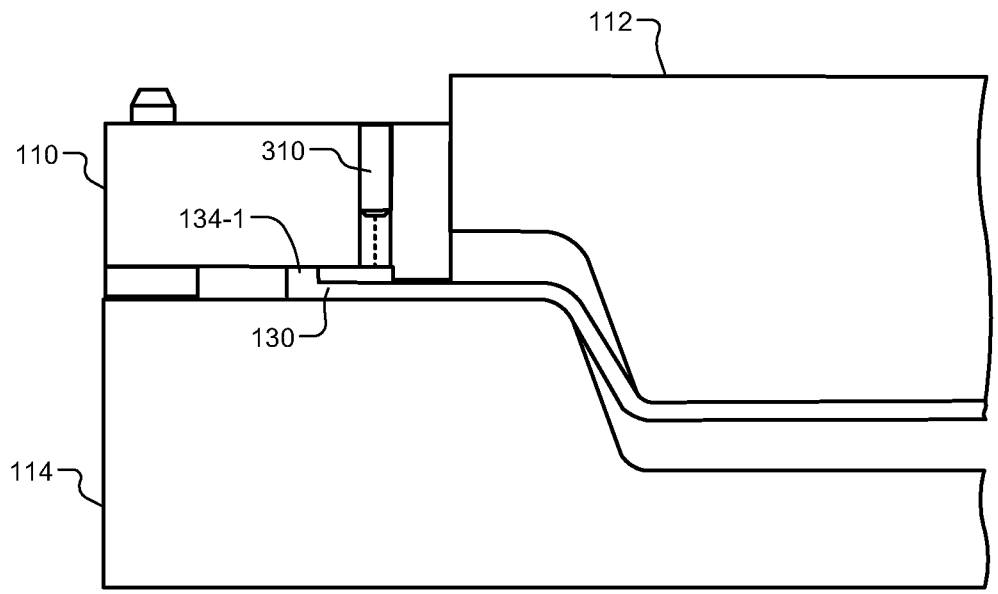
FIGS. 12 and 13 are side cross-sectional views of an example of a tool including a distance sensor according to the present disclosure.
Figure 13:
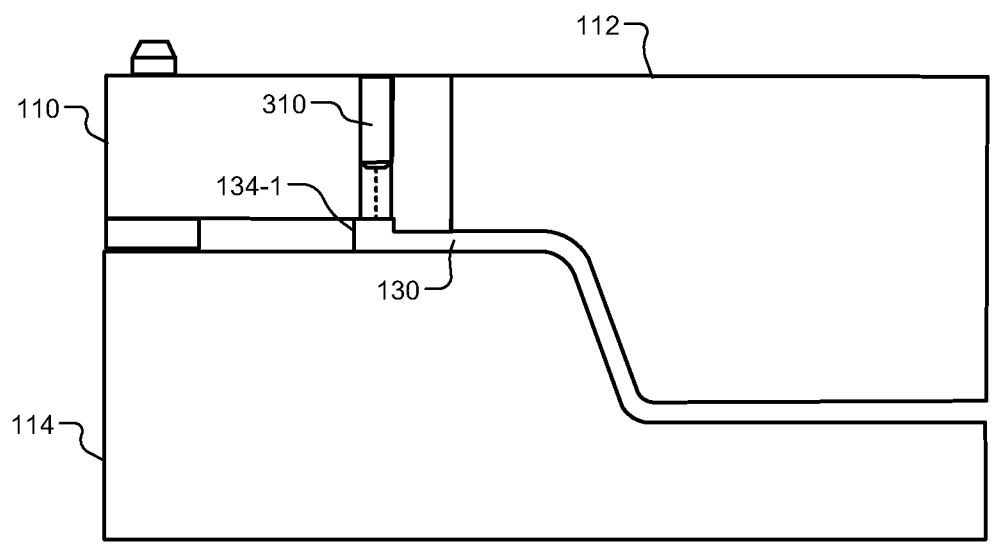

In some examples, when the preform 130 draws into the cavity 122 by a predetermined amount, the peripheral edge of the preform 130 is located under a distance sensor (FIGS. 12 and 13 described further below). When the distance sensor senses the higher thickness of the peripheral edge, subsequent stage(s) of forming (e.g., molding, curing, etc.) are performed. Ensuring that the preform is correctly positioned will likely reduce scrap to 0%.

Referring now to FIGS. 7 to 9, the binder 110, the lower tool 114, and the preform 130 are shown in further detail. In FIGS. 7 and 8, the binder 110, the lower tool 114, and the preform 130 are shown before and after pressing, respectively. A draw-in distance d is defined between the radially outwardly facing edge of the step 120 of the binder 110 and the radially inwardly facing surface at the peripheral edge of the preform 130. A thickness $t_2$ of the peripheral edge of the preform 130 remains the same during the process. Some minor changes may occur to a thickness $t_1$ of the preform 130 before pressing and molding relative to a thickness $t_3$ of the preform 130 after pressing due to drawing.

In FIG. 9, a surface length of the 3D composite panel minus a surface length of the 2D preform in a vertical plane 190 is equal to a sum of the first and second distances d1 and d2 between the first step and the second step (on opposite sides of the preform in the vertical plane 190) and the step 120 of the binder 110 prior to pressing the preform 130 in the tool 100.

Figure 10:
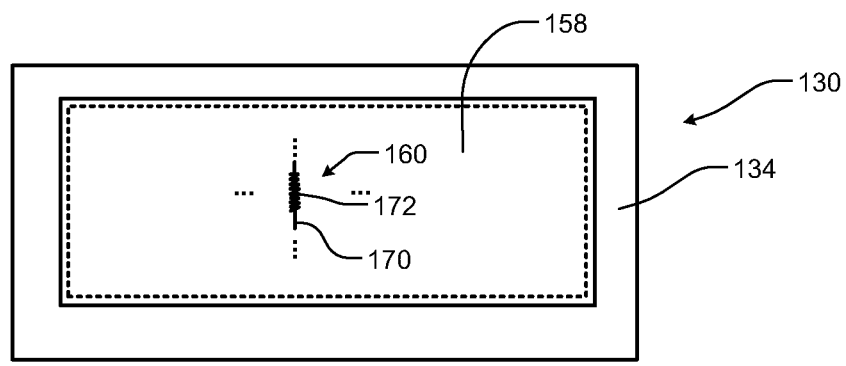
Figure 11A:
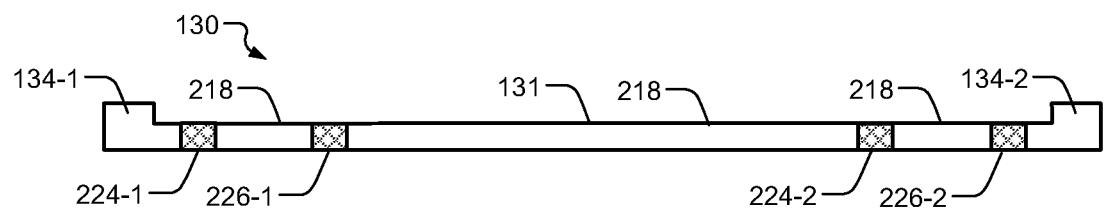
FIGS. 11A and 11B are side cross-sectional views of an example of a preform before and after pressing, respectively, according to the present disclosure.
Figure 11B:
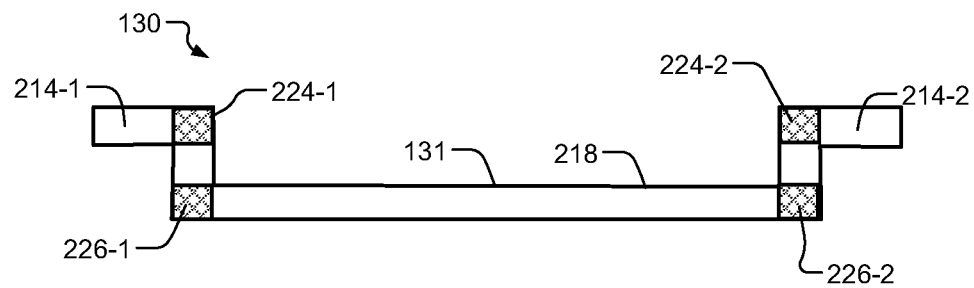

Referring now to FIGS. 10 to 11B, the preform 130 is shown in further detail. In FIG. 10, the preform 130 includes a backing sheet 158 and reinforcing fibers 160 arranged in a predetermined pattern on a surface of the backing sheet 158. In some examples, the reinforcing fibers 160 include fiber tow 170 that is stitched to the backing sheet 158 by a CNC machine using stitches 172. In some examples, the peripheral edge portion 134 is thicker than the center portions 131 of the backing sheet 158.

In FIGS. 11A and 11B, an example of the preform 130 is shown before and after pressing. In FIG. 11A, the preform 130 includes the peripheral edges 134-1 and 134-2, first regions 218 of the central portion with higher fiber density and second regions 224-1, 224-2, 226-1, and 226-2 of the central portion with lower fiber density to accommodate curves, bending, and/or folding. Locations of the first regions 218 and the second regions 224-1, 224-2, 226-1, and 226-2 will depend on the shape of the cavity 122 and other factors. In FIG. 11B, the second regions 224-1, 224-2, 226-1, and 226-2 are located at directional transitions of the cavity 122 such as corners.

Referring now to FIGS. 12 and 13, the binder 110 includes a distance sensor 310 to sense when the preform 130 is located correctly. The distance sensor 310 may be arranged radially outside of the step of the binder 110. As the preform 130 is drawn into the tool in FIG. 12, one or both peripheral edges are biased against the step 120 of the binder 110 to center the preform 130 relative to the cavity. When both of the distance sensors 310 (at opposite sides of the binder 110) sense the peripheral edge portion 134-1 and 134-2, then the final pressure can be applied by the tool 100 and resin injected.

Referring now to FIG. 14, a tool control system 400 includes a controller 410 that receives an output of one or more distance sensors 414. The controller 410 controls a heater 424 to heat the tool 100. In some examples, the heater 424 heats the tool to a temperature in a range from 90° C. to 130° C. The controller 410 may receive an output of a temperature sensor 425 that senses a temperature of the tool 100.

The controller 410 causes a robot 426 to load the preform 130 between the upper punch 112 and the lower tool 114. The controller 410 initiates movement of the binder 110 (to lightly engage the preform 130) and the upper punch 112 using positioning devices 418. When the distance sensors 310 sense that the preform 130 is positioned correctly, the controller 410 causes the upper punch 112 to move to a final position. At this stage, the preform location is assured and the control system can continue to the injection stage. In some examples, the preform position is checked after the punch moves to the final position.

Then the controller 410 initiates injection using a resin injector 422. After a curing period, the controller 410 causes the positioning devices 418 to move the upper punch 112 and the binder 110 upwardly. Then, the controller 410 causes the robot 426 to remove the preform 130 having a 3D shape from the tool 100. The controller 410 then repeats the process or ends the process.

Referring now to FIG. 15, a method 500 for forming a composite material is shown. At 510, the preform 130 is arranged in the tool 100. At 514 and 516, the binder 110 and upper punch 112 is moved into the lower tool 114. When the thickness is correct as determined at 518, the preform 130 is impregnated with resin during a predetermined impregnation period at 524. At 526, the preform 130 and resin are cured for a predetermined cure period. At 532, the upper punch 112 and the binder 110 are moved away from the lower tool 114. At 536, the composite panel is removed from the tool 100 and the process is repeated or ended.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A tool system for fabricating a composite panel, comprising:
   a lower tool defining a cavity;
   a preform including a substrate including a peripheral edge, a central portion, and a first step arranged between the peripheral edge and the central portion, the first step defining a radially inwardly facing surface, reinforcing fibers attached to the substrate and defining a first fiber density in first regions of the central portion of the substrate and a second fiber density in second regions of the central portion of the preform,
   wherein the first fiber density is lower than the second fiber density, and
   wherein the central portion of the substrate has a first thickness,
   wherein the peripheral edge portion of the substrate has a second thickness that is greater than the first thickness and forms the first step;
   a binder vertically moveable relative to the lower tool during preforming and including a first surface defining a second step with a radially outwardly facing surface configured to bias the radially inwardly facing surface of the first step to center and clamp the preform relative to the lower tool; and
   an upper punch vertically moveable relative to the binder and the lower tool to center the preform relative to the cavity during preforming, the upper punch and including a fluid passage configured to deliver resin to impregnate the preform arranged between the upper punch and the lower tool.

2. The tool system of claim 1, further comprising:
a distance sensor arranged on the binder and configured to detect the peripheral edge portion of the preform; and
a controller configured to control positioning of the tool in response to sensing the peripheral edge of the preform.

3. The tool system of claim 2, wherein the controller is configured to impregnate the preform with resin after confirming a position of the preform relative to the tool.

4. The tool system of claim 2, further comprising a robot, wherein the controller is configured to cause the robot to deliver the preform to the tool and to remove the composite panel from the tool.

5. The tool system of claim 1, wherein the second step has a second predetermined height in a range from 6 to 12 mm.

6. The tool system according to claim 1, wherein the upper punch is configured to move vertically through the binder forcing a portion of the preform into the cavity.

7. The tool system according to claim 1, wherein the preform includes a first length and the cavity includes a second length, the first length being greater than the second length.

\* \* \* \* \*